US008121881B2

(12) United States Patent
Fishman

(10) Patent No.: US 8,121,881 B2
(45) Date of Patent: Feb. 21, 2012

(54) PROJECT MANAGEMENT METHOD AND SYSTEM

(75) Inventor: Ilya M. Fishman, Palo Alto, CA (US)

(73) Assignee: Ibico, Inc., Palo Alto, CA (US)

( * ) Notice: Subject to any disclaimer, the term of this patent is extended or adjusted under 35 U.S.C. 154(b) by 1153 days.

(21) Appl. No.: 11/977,547

(22) Filed: Oct. 25, 2007

(65) Prior Publication Data

US 2008/0082388 A1    Apr. 3, 2008

(51) Int. Cl.
*G06Q 10/00* (2006.01)
(52) U.S. Cl. ............... 705/7.26; 705/7.11; 705/7.12; 705/7.13; 705/7.16; 705/7.18; 705/7.21; 705/7.22; 705/7.23; 705/7.24
(58) Field of Classification Search ..... 705/8, 7.11–7.42
See application file for complete search history.

(56) References Cited

U.S. PATENT DOCUMENTS

| | | | |
|---|---|---|---|
| 5,406,476 A | 4/1995 | Deziel, Jr. et al. | |
| 6,609,100 B2 | 8/2003 | Smith et al. | |
| 6,873,961 B1 | 3/2005 | Thorpe et al. | |
| 2006/0041447 A1* | 2/2006 | Vucina et al. ............ | 705/1 |

OTHER PUBLICATIONS

Chris Chapman, Project risk analysis and management—PRAM the generic process, International Journal of Project Management, vol. 15, Issue 5, Oct. 1997, pp. 273-281, ISSN 0263-7863, DOI:10.1016/S0263-7863(96)00079-8. (http://www.sciencedirect.com).*
A. Ledwith, S.H. O'Callaghan, NPD Project Schedules—Great Works of Fiction, IEEE 2002.*
Vittorio Magni, Perturbation theory of nonlinear resonators with an application to Kerr-lens mode locking, J. Opt. Soc. Am. B, 1996.*
Max Born, Principles of Optics, Pergamon Press, 1959.*
http://www.jrothman.com/Papers/rolling-wave-planning.html. Starting With Rolling Wave Planning.*
http://www.microsoft.com/uk/atwortdwork/taskplanning.mspx. Task Planning: best-practice tips for Microsoft Project users.*
Myers, et al., "Integrating Planning and Scheduling.."Proceed. European Conference, pp. 1-13, Sep. 2001, Toledo, Spain.
Myers,et al., "Passat", Proced. 3d International NASA Workshop,pp. 1-10, Oct. 2002, Houston, TX.
Feynman, et al "The Feynman Lectures on Physics", p. 11,1965 Addison-Welsey Publish. Co, Inc,Reading , MA, Palo Alto, London.
Born, et al "Principles of Optics",pp. 402-403, 1959,Pergamon Press, NY, London, Paris, Los Angeles.
Decisioneering, Inc "Cristal Ball" ,Mar. 16, 2005/ Information on the products.
Powersteering Software "Press release", Jan. 18, 2005/ information on the products.

* cited by examiner

*Primary Examiner* — Jason Dunham
*Assistant Examiner* — Richard Scheunemann
(74) *Attorney, Agent, or Firm* — Bella Fishman

(57) ABSTRACT

The method and system for managing a project with multiple tasks and milestones by defining probabilities of key project events and assessing their performance risk. Each task of the project is described as a waveform propagating from this task to an assigned milestone, and each milestone is described as a coherent superposition of task waveforms. The probability of any milestone is obtained by comparison of probabilities of non-perturbed and perturbed milestone, which caused by delay of a task or combination of tasks.

5 Claims, 11 Drawing Sheets

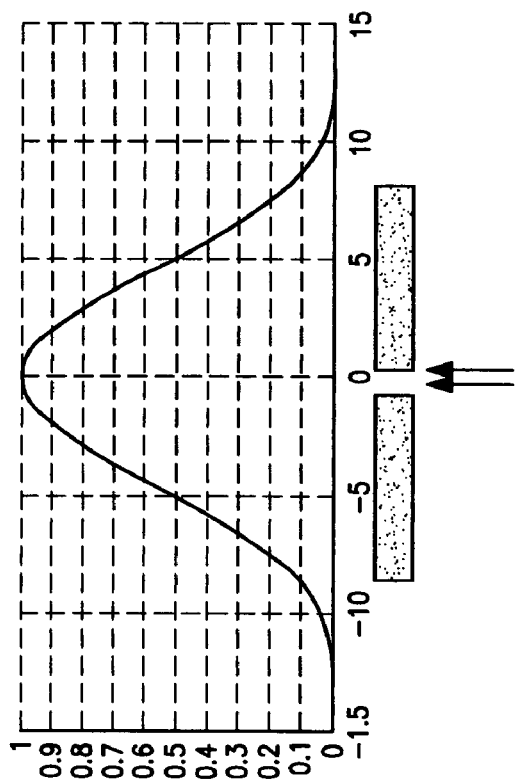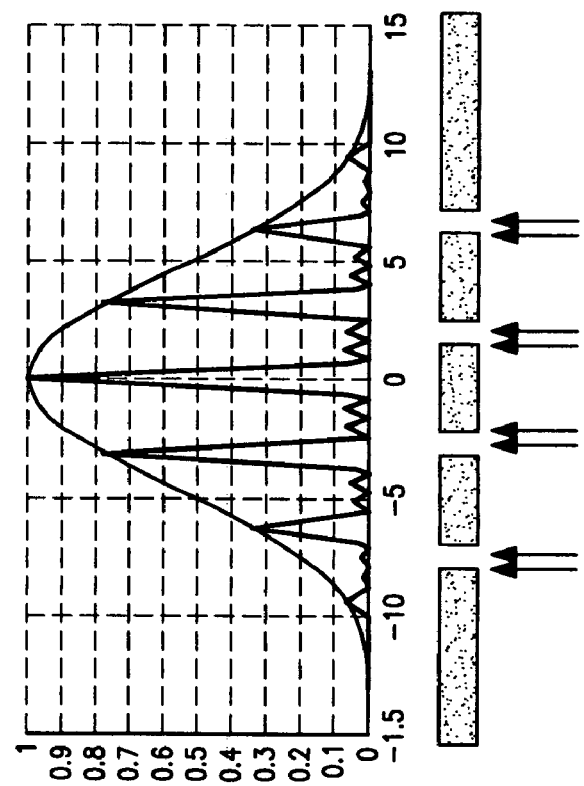
FIG. 2a
FIG. 2b

PROJECT MANAGEMENT METHOD AND SYSTEM

RELATED APPLICATION DATA

This application is related to the U.S. Patent Application No. 60/691,448 entitled "Project Management Method and System" by inventor Fishman, I. M., which was filed on Jun. 17, 2005.

FIELD OF THE INVENTION

This invention relates to a method of assessing milestone risk in program and project management and a system for performing this method.

BACKGROUND OF THE INVENTION

Project plans are created to visualize and store data describing stages of design, implementation and manufacturing of future products and processes. A typical example is a several month long product development plan consisting of several hundred tasks performed by several dozen people. Even for this relatively moderate size project, creating a low-risk plan with consistent delivery on project milestones is a difficult problem, especially if the plan includes engineering, marketing, manufacturing, sales and support tasks, often executed at different geographical locations. For complex industrial projects (for example, multi-thousand task aircraft manufacturer projects), development of a consistent plan and schedule and its successful execution becomes extremely challenging because of a large number of project tasks and diversity of their attributes: duration, sequence, multiple predecessors and followers, resource sharing etc.

Small projects consisting of several tasks could be handled manually and may not even need detailed documentation. However, when the plan complexity increases manual planning becomes risky and inefficient. To reduce risk, wide variety of software packages is used for managing project data. A typical generic package is Microsoft Project. For more specialized applications, multiple packages are developed improving planning and scheduling in specific industries (a typical example is Primavera Project Planner), and a number of patents are issued suitable for specific types of processes and enterprises. For example, U.S. Pat. No. 6,609,100 [L. E. Smith and E. W. Balunas, Program Planning Management System] describes development of complex plans in aerospace industry by sorting and grouping of tasks between a database and a scheduler under user control. U.S. Pat. No. 6,873,961 B1 by S. W. Thorpe and R. C. Higgins describes method and apparatus for identifying and tracking military project trends in real time. Artificial Intelligence (AI) approaches intended for military and intelligent applications establish balance between the human and computer authority in the planning, scheduling and execution processes. A typical example is PASSAT [Myers, K. L., et al., *PASSAT: A User-centric Planning Framework*, in Proceedings of the Third International NASA Workshop on Planning and Scheduling for Space, 2002], organized around a library of templates encoding and prioritizing sub-plans and tasks around their commitments, previous experience, important knowledge etc. Model studies show AI tools may substantially improve time required to generate the plan, number of interactions between planners and schedulers, etc. [Myers, K. L. et al., *Integrating Planning and Scheduling through Adaptation of Resource Intensity Estimates*. Proceedings of the 6th European Conference on Planning (ECP-01), 2001].

Another approaches to improve planning and scheduling is analytical evaluation of plan risk based on mathematical tools. If the probability distribution is defined for each task, the milestone and the full project probability may be also defined. For example, if the milestone includes two individual tasks with durations $y_1$ and $y_2$ and dispersions $\sigma_1$ and $\sigma_2$, respectively, then the dispersion of the milestone $\Sigma$ is defined by a relation:

$$\Sigma^2(y_1+y_2)=\sigma_1^2+\sigma_2^2\pm 2\rho_{12}\sigma_1\sigma_2 \qquad (1)$$

where $\rho_{12}$ is the mutual correlation coefficient. For independent tasks, $\rho_{12}=0$. Similar relations may be applied to the milestones including more than two tasks. With the probability distribution known for each task, the probability of performing any milestone and the whole project may be calculated. To overcome analytical difficulties caused by multipath correlations Monte Carlo computer simulations were developed. Respective programs are available commercially [http://www.cbpredictor.com/cases/caseindex.html, http://www.psteering.com/home/home.cfm], but for large projects they are not very efficient: even moderate task dispersion may result in very broad probability distributions. In a simple case where a milestone is comprised of 100 consecutive independent tasks of equal duration D, each duration being defined with 10% accuracy, the milestone probability distribution has dispersion equal to the task duration:

$$\sqrt{\Sigma^2(y_1+y_2+\ldots+y_{100})}=0.1D\sqrt{100}=D \qquad (2)$$

To improve the resolution, each task could be further subdivided into sub-tasks; if the number of sub-tasks is 100; the milestone dispersion is decreased by $\sqrt{100}=10$ times, according to conventional rules for random processes. Thus, milestone dispersion improves slowly, and the effort to define the detailed task structure might exceed the effort to perform the task. In practice, even 10% accuracy for the task duration may be difficult to achieve. For large projects consisting of hundreds and thousands of tasks and dozens of milestones, improvement of the task duration tolerances by sub-dividing into sub-tasks is unrealistic.

Therefore new approaches are needed to increase confidence in planning and execution and improve ability to evaluate plan quality from entirely structural point of view, unrelated to the industry specifics.

SUMMARY OF THE INVENTION

According to the present invention a method of analysis, design and execution of plans defines probabilities of key project events (milestones) utilizing quantum mechanical algorithm. The plan is subdivided into pluralities of tasks reporting or assigned to the respective milestones. Temporal profile of each milestone is defined as an interference pattern of wave functions of the tasks assigned to the milestone. Each task is sequentially perturbed, delayed and sensitivity of the milestone to each task delay is defined by comparison of perturbed and non-perturbed milestone temporal profiles.

To manage the projects according to the invention, the original project plans presented in different formats such as Microsoft Project, PrimaVera or others are transferred into a common format, for example, Microsoft Excel, and rigorous task assignment to the milestones is established. Each task is presented by a waveform propagating from the task to the respective milestone, while each milestone is presented as a coherent superposition of the task waveforms propagating from each task to its respective milestone. A non-perturbed probability is defined for each milestone as unity. Then at least one task is delayed causing perturbation of the milestone. The probability of the perturbed milestone is defined by comparing it with probability of the respective non-perturbed milestone.

Each task of the project has a duration and a time gap between a task end and its milestone, and is presented by the waveform having at least a $2\pi$ task phase shift, which represents at least one activity cycle. The task parameters are defined through quantum mechanical wave function by introducing a task probability amplitude ψ for each task. A milestone probability amplitude Ψ is defined as a coherent superposition of the task probability amplitudes. A milestone probability density is defined as P as $P=|\Psi|^2$, and integral of probability density P is normalized to unity. After each task is sequentially perturbed, the respective variation Δψ of the task probability amplitude ψ is determined as well as probability density for the milestone with perturbed task wave functions. To define the parameters of the wave function ψ it is necessary to define a task wave vector κ depending on the task duration D and a number of the activity cycles N. Comparison of milestone probability density for perturbed and non-perturbed task wave functions allows for a risk assessment of the milestone caused by perturbation of wave functions of tasks and prioritizing tasks for maximizing the probability of the respective milestones.

A computer system is designed to perform the method of the present invention. The system comprises units for inserting and editing input data, analyzing it and obtaining feedback requested for planning and execution.

Utilizing the method and system of the present invention on the planning, design and analysis stages provides data for determining milestone risk relative to each task independently of the plan complexity and industry specifics. The present invention gives the ability to design the plan supporting the task risk prescribed to each given task or group of tasks and the ability to compare different versions of the plan or different plans and determine preferred version of the plan without knowledge of individual tasks tolerances.

On the execution stage, reduction of milestone probability related to any task slip is immediately reported to the executive managers; thus, milestone risk is managed at very early stages.

BRIEF DESCRIPTION OF THE DRAWINGS

The foregoing aspects and advantages of the present invention will become better understood upon reading the following detailed description and upon reference to the drawings where:

FIG. 2 (prior art) illustrates quantum mechanical (optical) diffraction by one slot (a) and four slots (b) [M. Born and E. Wolf, *Principles of Optics*, Pergamon Press, NY, 1959].

DETAILED DESCRIPTION OF THE INVENTION

Milestone Probability Calculation

Figure 1:
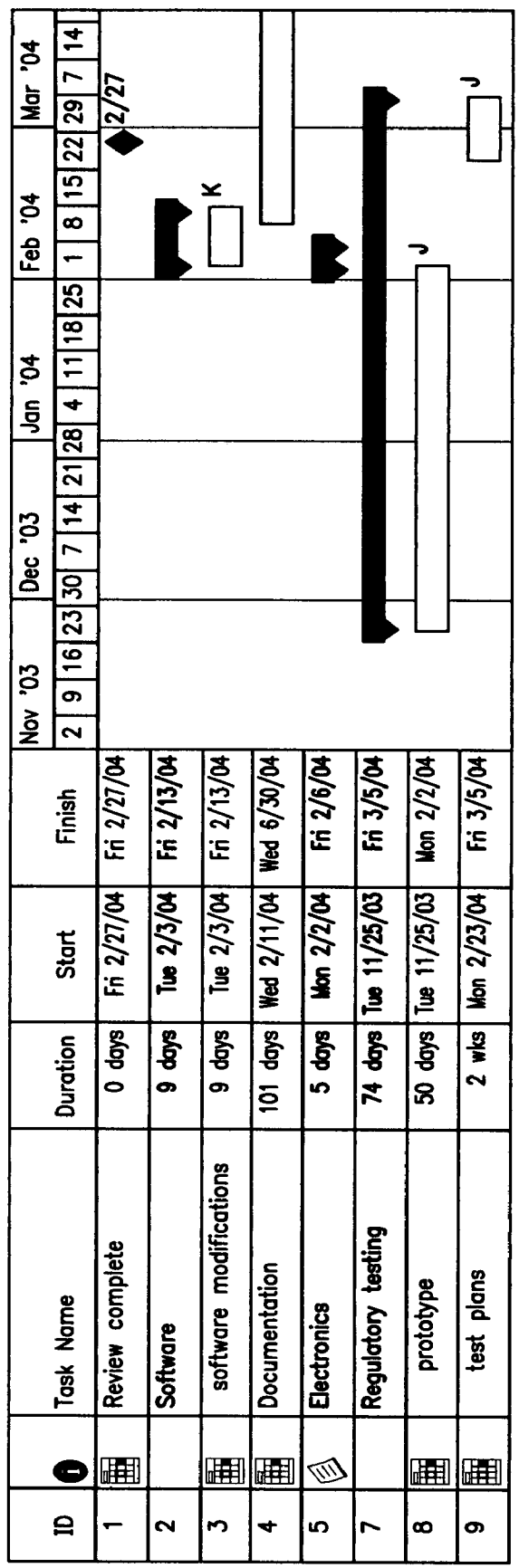
FIG. 1 (prior art) shows project format in Microsoft Project. Scheduled tasks are depicted as Gantt chart bars (1), milestone is shown as a rhomb (2).

FIG. 1 shows a fraction of Microsoft Project file, where project tasks are listed with their attributes (title, duration, start and end date, resources and predecessors), and Gantt chart tasks visualizing the task duration and its relative position to other tasks. Projects involving human activity are different from projects performed by robots. Unlike tolerances for mechanical or electrical parts, human task durations are not defined accurately. Human activity is administered by deadlines, and often a substantial amount of work is done just before the deadlines (milestones). In the field of industrial management, the supervisor may push the group activity towards completion of the milestone. Commonly, a human task may be planned for 1 or 2 days, but barely for 1.1 days or for 1.01 days. The lack of task duration accuracy is compensated by very high flexibility of human productivity. For example, with incentives and appropriate work organization, the task scheduled for 2 weeks may be performed in 1.5 or even 1 week. According to the present invention, the milestone probability and duration may be calculated with high accuracy without exact knowledge of task durations using principles of quantum mechanics. Unlike classical formalism of Eq. (1) and (2) predicting increase of the outcome uncertainty for large number of tasks, quantum mechanical formalism describes a short event (milestone) as a result of diffraction of long events (tasks) similar to sharp focusing of many plane waves of light or electrons with different wave vectors into small spatial areas by Freshnel lens. Each task is characterized by its duration and productivity. Tolerances of duration and flexibility of human productivity are framed by uncertainty relation, similar to uncertainty relation for coordinate and momentum of a microparticle in quantum mechanics. Following quantum mechanical principles, each task is described by a wave function (probability amplitude). The probability amplitude of the milestone is presented as a superposition (or other appropriate function) of probability amplitudes of individual tasks interfering at the milestone. Interference is extremely sensitive to relative task phases. The probability of reaching a milestone is calculated as a probability amplitude square. Thus, the events occurring in multi-task projects (tasks and milestones) are characterized by a diffraction pattern of individual tasks (and respective uncertainty relation). Structure of diffraction pattern illustrates how a short milestone event might be originated from long tasks.

In quantum mechanics, microscopic particles are characterized by a wave function (probability amplitude) ψ, and the probability P is calculated according the formula $P=|\psi|^2$. One of the fundamental quantum mechanical features is interference of amplitudes. For example, if the system wave function is $\psi=\psi_1+\psi_2+\psi_3+\ldots$ then the probability P is $$P=|\psi|^2=|\psi_1|^2+|\psi_2|^2+|\psi_3|^2+2\psi_1\psi_2+2\psi_1\psi_3+\ldots \quad (3)$$

and mutual coherence between the individual wave functions $\psi_i$ directly defines the output (3). Difference between quantum mechanical probabilities and conventional probabilities is illustrated in FIG. 2a [see, for example, Feynman, R. P., Lectures on Physics, Addison-Wesley Pub, Sd, 1964), showing probability to detect a micro-particle under certain angle after it passes through the slot in the wall, and FIG. 2b showing probability of micro-particle detection after passing through four slots in the wall. FIG. 2b looks like a diffraction pattern caused by a wave scattered by four slots simultaneously, with distinctive interference maximums interleaving with the angles where the probability of scattering is small. The interference nature of the probability pattern is specific for quantum mechanics or optics and does not exist in conventional (classical) calculation of probabilities. Contrast of diffraction picture grows rapidly with increasing number of slots. FIG. 2b is an example of how interference provides well-determined response of many objects acting together while individual scattering process is very uncertain.

Figure 3:
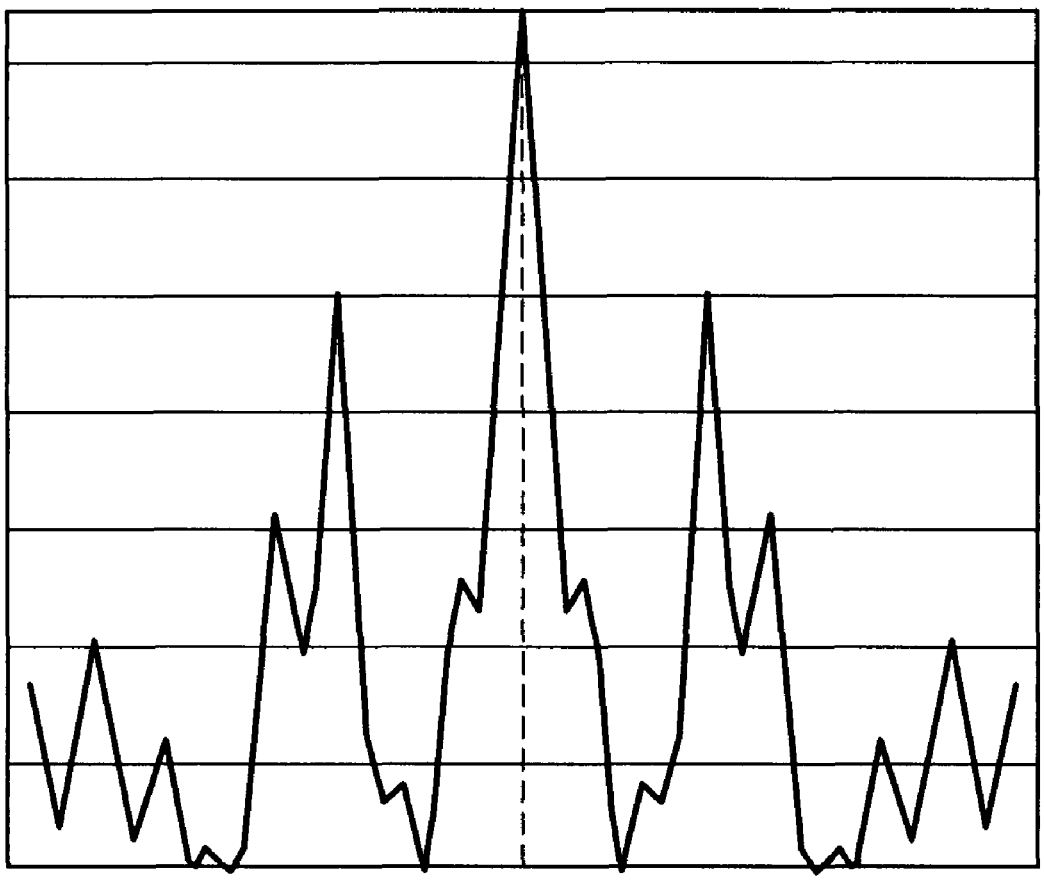
FIG. 3 shows diffraction by a random quantum mechanical grating comprised of potential wells (tasks); 1—project task, 2—wave field.
Figure 3:
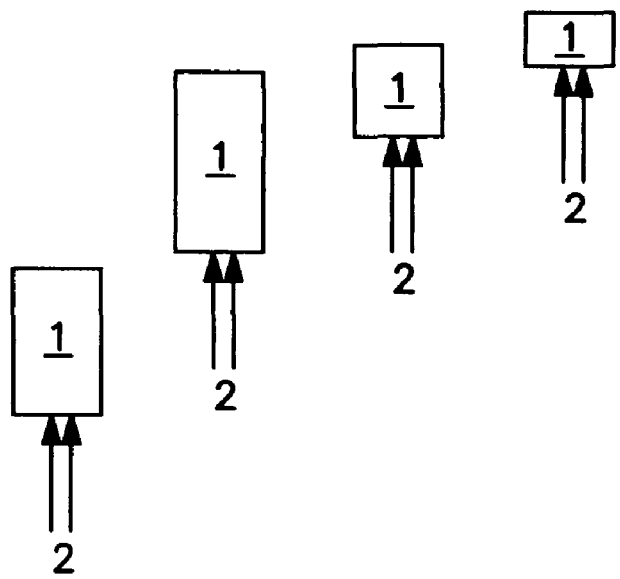

In application to multi-task projects, milestone diffraction pattern is composed as a superposition of diffraction fields from individual task sources as shown in FIG. 3 where a fraction of Gantt chart comprising several tasks (1 in FIG. 3) acts as a diffraction grating scattering wave fields (2 in FIG. 3). Wave fields are defined by their wave vectors k and represent variations of a human activity as a function of task phase. It is presumed that the uncertainty relation $\Delta k \Delta x \geq 1$ is valid meaning that to define the task duration with higher accuracy, human activity has to be sub-divided into many cycles. The wave fields (2) pass through tasks (1) as through bricks of condensed matter, accumulate respective phase shifts and interfere in the plane of a milestone. Mechanism of phase shift accumulation in the Gantt chart bricks is defined similar to other situations where wave phase shifts occur in field-to-matter interactions (in optics, phase shift is defined by a dielectric function of the material, and charged micro-particles change their phase in external potentials). For the project tasks, wave functions may be associated with variations of the human activity, and the task funding may play the role similar to electrical charge of condensed matter samples (1 in FIG. 3). On-schedule tasks are assumed to superimpose in-phase at the planned milestones dates. Diffraction patterns (FIG. 3) describe respective probabilities and are calculated as the square of the sum of all wave functions associated with the milestone (Eq. (3)).

Though regular structure of slots in FIG. 2 creates diffraction pattern different from random structure of tasks of FIG. 3, the pattern contrast increases when the number of tasks grows. Pattern of FIG. 2 comprises sharp intensity maximums and zeroes; diffraction pattern of FIG. 3 is irregular, with the only definitive and strongest maximum in the center (proportional to the square of the number of tasks), irregular structure of other diffraction orders and non-zero minimums. For large number of tasks, the method presented in the invention defines milestone parameters with an accuracy exceeding the variance (dispersion) of individual tasks. For different configurations of task and milestone schedules, interference of tasks amplitudes results in specific temporal structure of milestones. For example, task slippages result in phase shift, loss of coherence and reduction of probability (Eq. (3)).

In the present invention, task wave functions are calculated in a quasi-classical limit and have a universal form [R. P. Feynman, A. R. Hibbs, Quantum Mechanics and Path Integrals, McGraw-Hill, 1965]

$$\psi \approx \exp(\smallint kdx) \quad (4)$$

Figure 4:
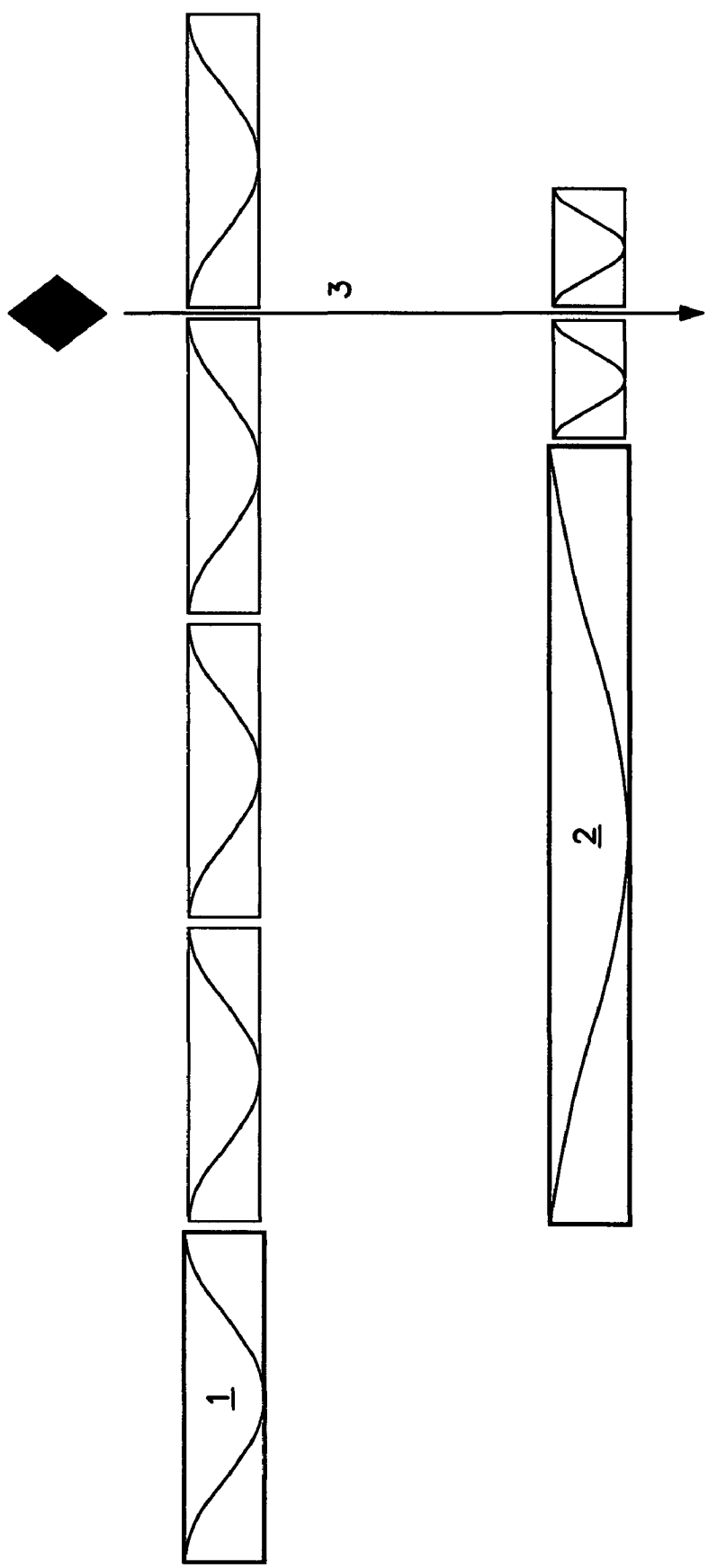
FIG. 4 shows project tasks (1, 2) and their wave functions, 3—milestone.

The value and spectral content of the wave vector k in Eq. (4) fully define the wave function. In analogy with the description of electron having energy E and moving in an external field U(x), the task wave vector is defined as $k=\sqrt{2[E-U(x)]}$ with all variables re-defined in terms applicable to multi-task projects. The project progress towards completion is considered a movement along the planned time x distinguished from real time t. Energy E~0, and external field U(x) is associated with the task funding. The task wave functions defined according to Eq. (4) in rectangular potential wells are graphically presented in FIG. 4. The fundamental task wave vector K is defined as $\kappa=2\pi/D$ where D is task duration. Each task wave function accumulates at least $2\pi$ phase shift inside the task well. Outside the task well, external potential is defined to propagate the wave function through the milestones, and mutual coherence is forced for the tasks affiliated with each milestone. At the milestones, mutual interference in-phase for all task wave functions is forced to provide peak of probability density. Outside of the task wells, wave vectors are defined as close as possible to the wave vector inside the well; for relatively short tasks (1 in FIG. 4) far from the milestone (3 in FIG. 4), wave vector perturbation is small. For long tasks or tasks close to the milestone, the wave vector perturbation may be substantial (2 in FIG. 4). Wave function amplitudes equal unity for all tasks assuming that all tasks are essential for milestone completion. Milestones comprised of many short tasks will conventionally have less variance and therefore sharper peaks.

The method demonstrates the effect of the particular task slip on the probability of the milestone but the probability of a particular task to slip is not calculated. If the probability of an individual task has to be evaluated, the task may be sub-divided into several sub-tasks, all sub-tasks reporting to a milestone. As a result, the task wave function would be defined as a wave packet consisting of sub-tasks wave functions. Increasing the number of sub-tasks corresponds to transition from quantum to quasi-classical approach in calculating probabilities of "large" tasks (see FIG. 1, also R. P. Feynman, A. R. Hibbs, cit.). An alternative method of quasi-classical task description is increasing the task wave vector k by a factor N (N=2, 3 . . . ) meaning that the task duration is defined with higher accuracy (see FIG. 6 below).

If a task slips by $\Delta D$ days, its phase $\phi$ slips by $\Delta\phi=\kappa\Delta D$ changing the task contribution to the milestone probability (Eq. (3)). Coherent interference is partially destroyed, and the milestone probability drops. The model properly accounts for bigger probability drops (larger phase shifts) associated with tasks that have dependencies to other tasks. Tasks scheduled to be completed just before milestones have higher impact on milestone probability than similar tasks performed long before milestones. In chains of mutually dependent tasks, perturbation of the first task causes perturbation of the whole chain increasing risk for the milestone. For large and remote milestones, the probability drop is smaller than for immediate ones, etc. Sharing common task resources and associated risks may be accounted for by overlapping respective task wave functions. If two tasks with wave functions $\psi_1$ and $\psi_2$ share resources, then the risk associated with resource sharing is characterized by overlap integral $$R=|\smallint \psi_1\psi_2 dx|^2 \quad (5)$$

In (5), integration limits are defined by the planned task overlap. If one of the tasks slips integral (5) changes; to restore the initial value of the integral, the second task has to be extended or contracted. For example, extension of task 1 might cause delay of the beginning of task 2 even if these tasks are not linked to each other but share same resources.

Figure 5B:
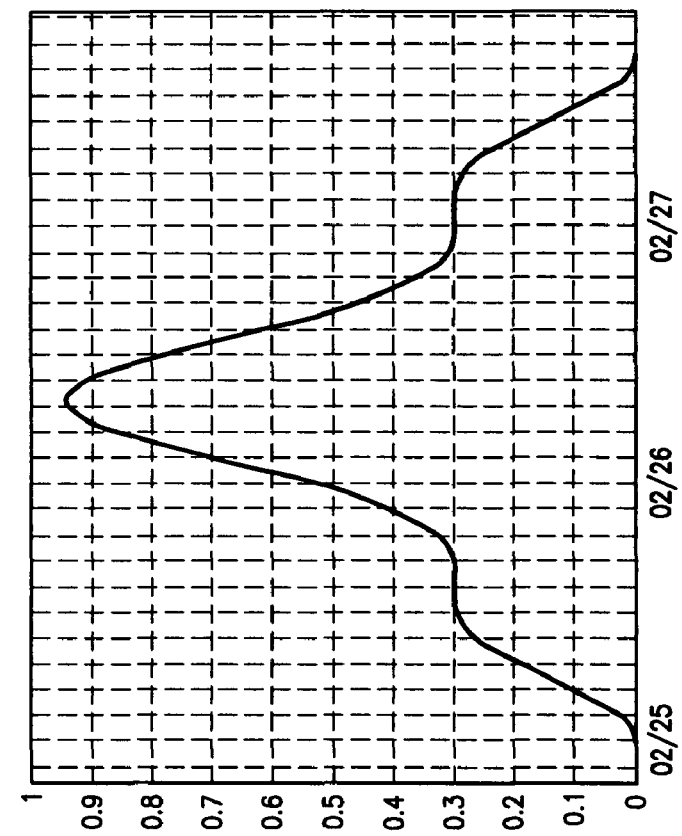
FIG. 5 shows the milestone as a diffraction pattern of all associated tasks wave functions:
a—diffraction pattern of task wave functions interfering in the full range of their durations;
b—diffraction pattern of task wave functions is cut off and normalized at first deep minimum.
Figure 5A:
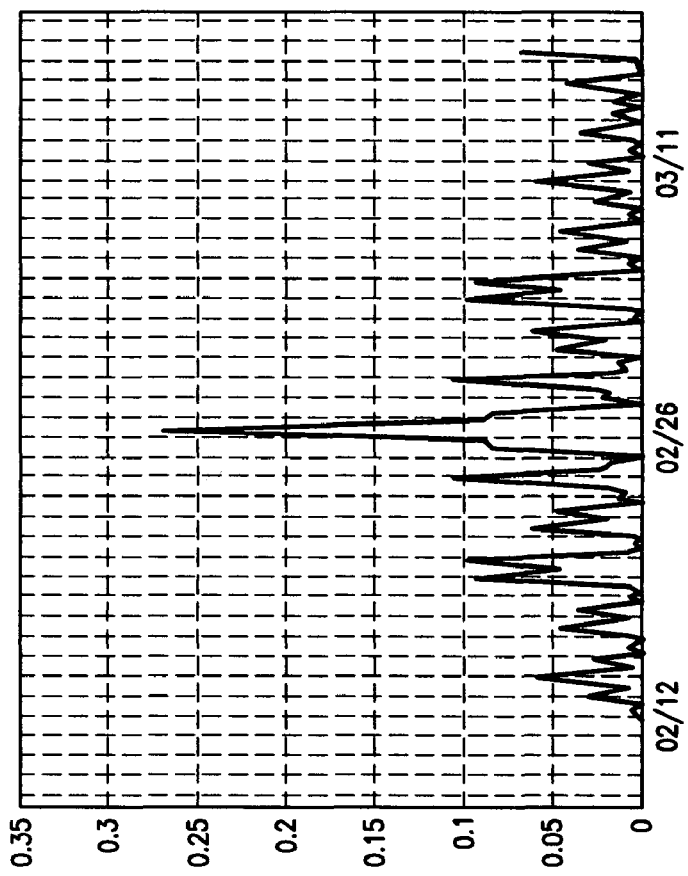
Figure 6:
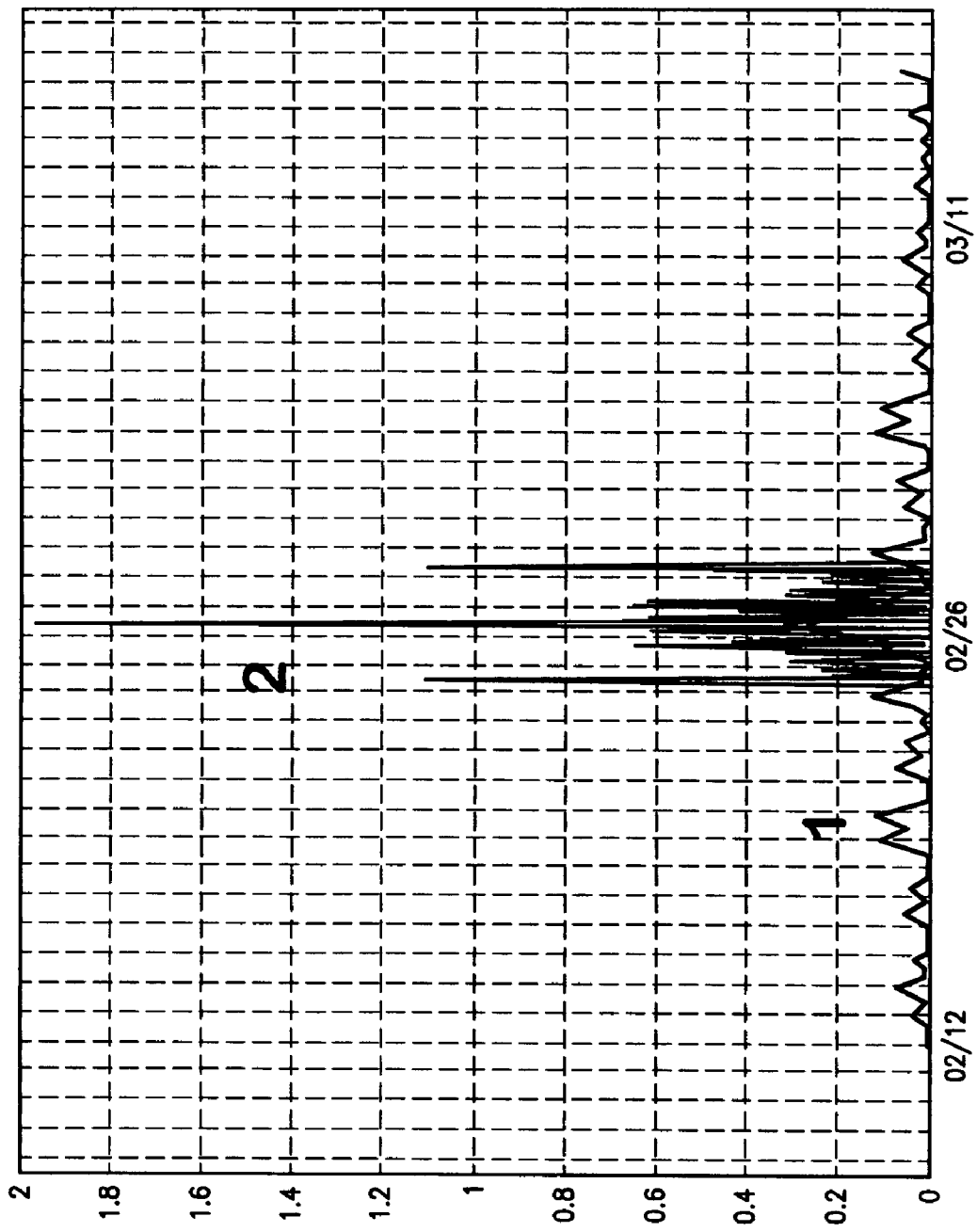
FIG. 6 shows diffraction patterns of the milestone defined with one activity cycle within each task (black curve 1) and 10 activity cycles (green curve 2), and corresponds to quasi-classical description of task tolerances.

Example of Application of Quantum Mechanical Model to Milestones of Commercial Project The following is an example describing application of quantum mechanical model to milestones of a commercial project comprising over 200 tasks and over 20 resources. In FIG. 5a, the full diffraction pattern is presented for one milestone. It will be seen from FIG. 5a that the diagram is a complex function of planned time revealing interference along the planned time axis, similar to diagrams of FIGS. 2, 3. The horizontal axis is marked in days while the vertical axis is probability density. The probability density is concentrated close to the planned milestone date. According to the present invention, the milestone date is defined as the central diffraction maximum, the diffraction pattern is cut off at the first deep minimum (for example, less than 1% of the maximum), and probability density is normalized to unity (FIG. 5b). It will be seen that though the tasks reporting to the milestone are rather long (1 week and longer), the milestone half-duration is less than 1 day. The choice of cut-off probability density point is arbitrary, but related uncertainty is small. FIG. 5 clearly shows how a short milestone event may be modeled by interference of wave functions of long tasks. Graphically relation between quantum and classical descriptions of the milestone probability is shown in FIG. 6, where black curve 1 is the same as FIG. 5a, and green curve is a result of milestone modeling with all wave vectors multiplied by a factor of 10 (meaning that the number of activity cycles in each task is 10; respectively, the task duration uncertainty is 10 times less than for the curve 1. In quantum mechanics, it corresponds to wave functions with high quantum numbers). As expected, the diffraction pattern squeezed, and the envelope of the function 3, about 3 days wide, may be used to evaluate full milestone tolerance if the task tolerances are known.

Figure 7:
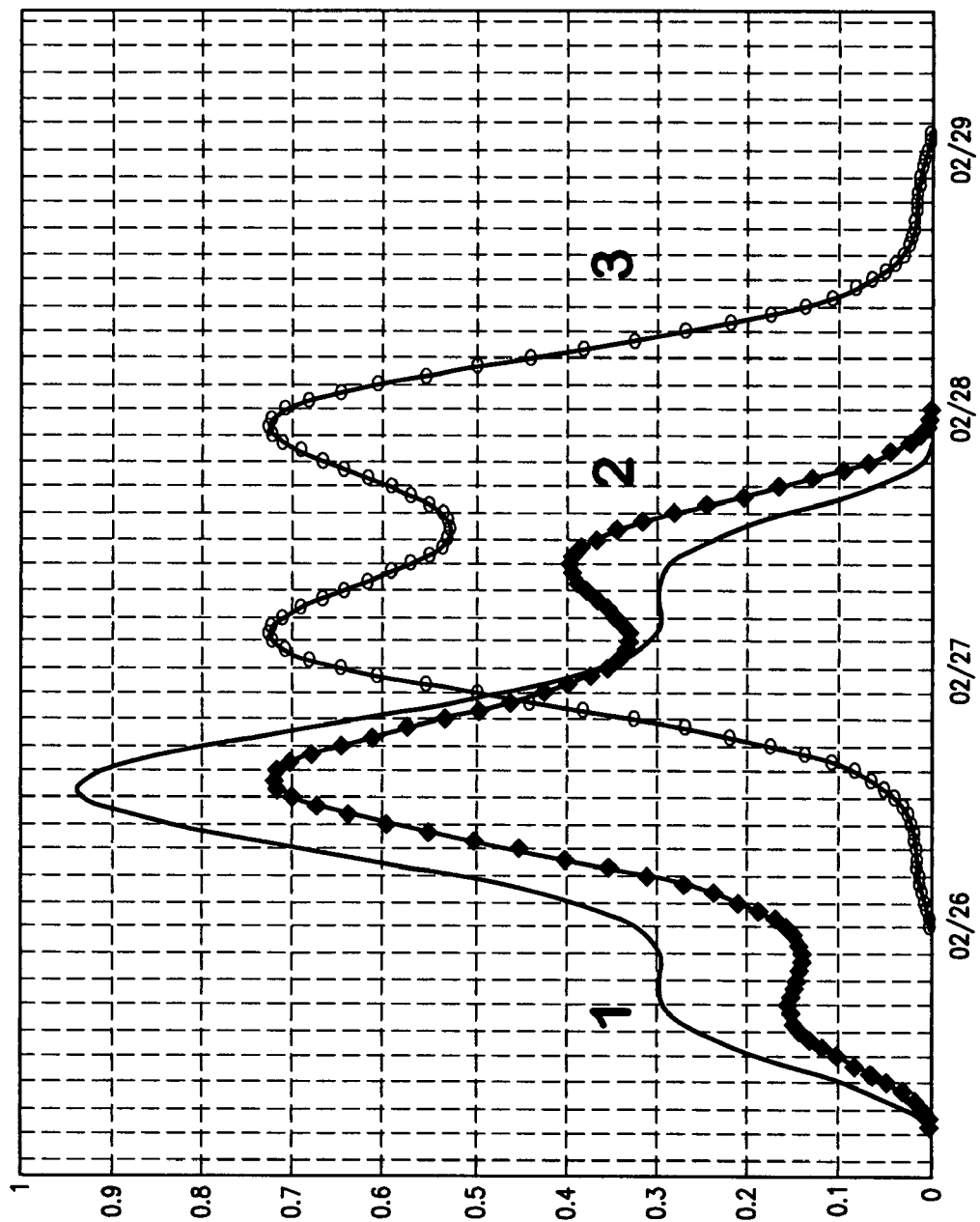
FIG. 7 shows undisturbed milestone temporal profile (1) and results of two different task perturbations (2 and 3).
Figure 8:
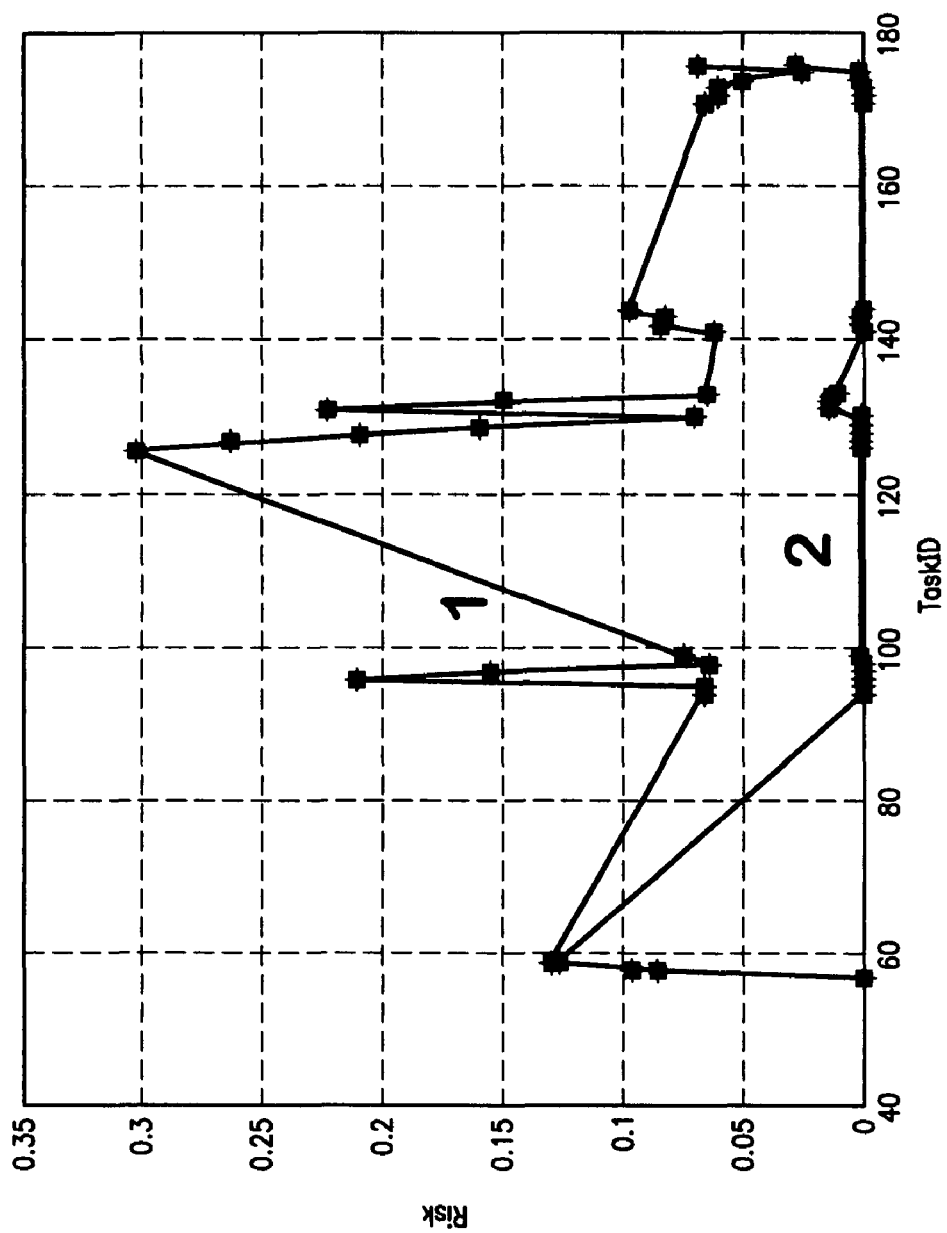
FIG. 8 shows milestone sensitivity to local (1) and global (2) task perturbations.

According to the method of the present invention, all milestones can be tested for perturbations. For a perturbation, each task may be extended, and the sensitivity of each milestone to each task can be measured. Curves 2 and 3 of FIG. 7 show the milestone patterns with 1-day task extension of two reporting tasks and same normalization as for unperturbed milestone. If the shifted or otherwise distorted milestone diagram is integrated within the limits of unperturbed pattern, the integral may be used to measure reduction of the milestone probability (for no perturbations, the integral is unity). If each task reporting to milestone is perturbed sequentially, milestone sensitivity to the task perturbation may be determined. Data for probability variations caused by different tasks provides a characterization tool for project milestones complementary to Gantt chart. FIG. 8 describes a milestone with 17 reporting tasks. Curve 1 of FIG. 8 shows milestone sensitivity to task perturbation. X-axis is task number from Microsoft Project file, tasks are marked on the curve, Y-axis is milestone-planned risk defined as (1-probability). It will be seen that milestone risk caused by different tasks varies substantially.

Local and Global View

For the curve 1 of FIG. 8, task phase shifts caused by task perturbations are considered non-dependent of the distance between the task end and the milestone; in other words, if a 1-day task is extended to 2 days, the milestone perturbation is the same, whether this task is performed 1 week or 1 month before the milestone. For the project manager directly responsible for the task the distance to the milestone does not matter; however, for the full-program manager it is important how much time remains between the task end and the milestone: the longer is this period, more chances are that the task could still be completed before the milestone. To incorporate this idea into the analytical tool, the phase shift caused by the task delay is multiplied by an exponential function $\exp(-D/L)$ where D is task duration, and L—distance between the task end and the milestone. For $\exp(-D/L) \sim 0$ (long tasks or tasks close to milestones), the phase shift is fully applied at the milestone; for $\exp(-D/L) \sim 1$ (short tasks or tasks far from the milestone) the phase shift decays by an exponential factor. Respectively, milestone sensitivity calculations are presented by two curves (FIG. 8) where curve 1 is called local (D/L=0) and curve 2 called global (D/L→∞). If the task end is close to the milestone such as tasks 58 and 59 in FIG. 8, the global and local risks practically coincide. For the tasks inside the milestone, such as 96 or 126, the global risk may be orders of magnitude smaller than local.

Figure 9:
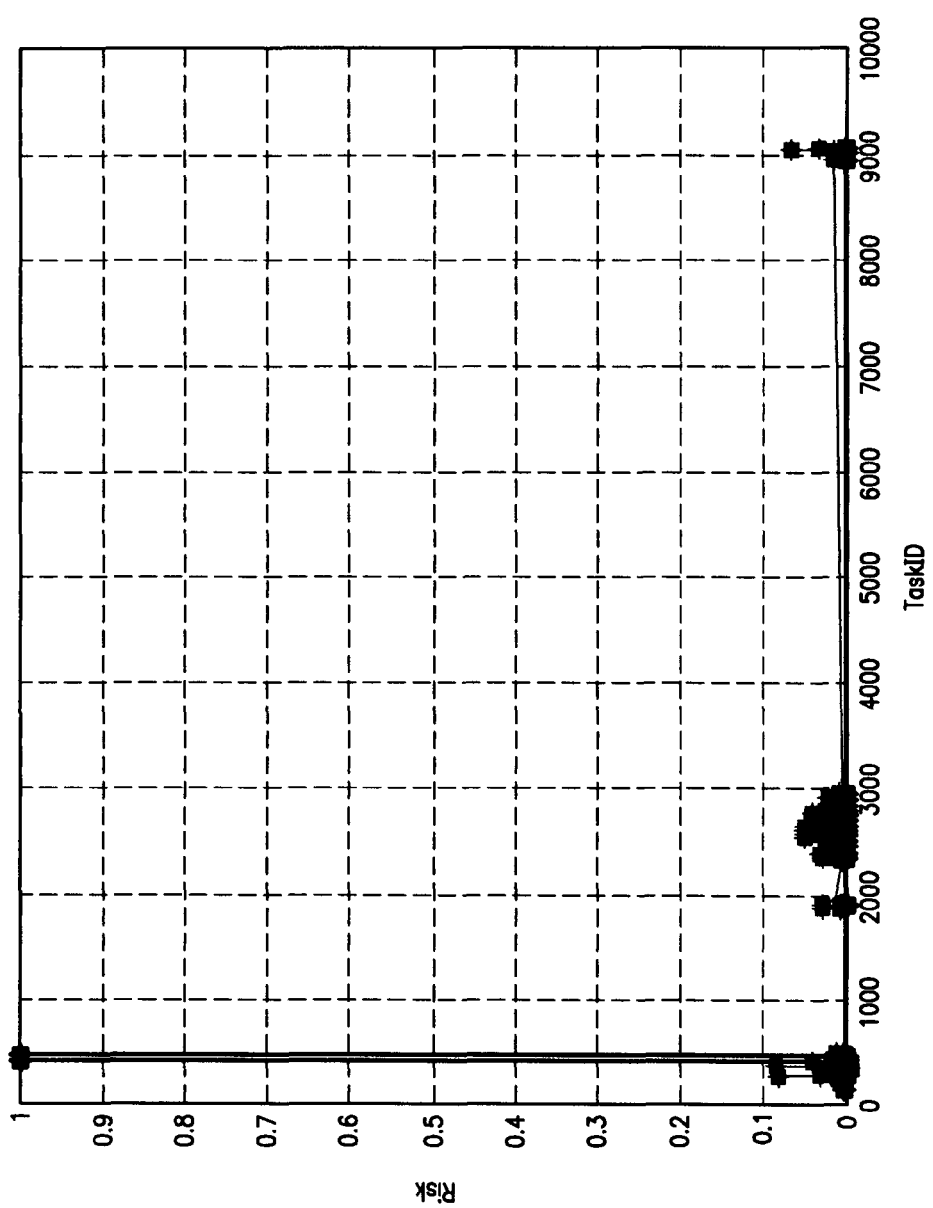
FIG. 9 shows milestone sensitivity to local (black) and global (red) task perturbations for a milestone comprising 432 tasks.
Figure 10:
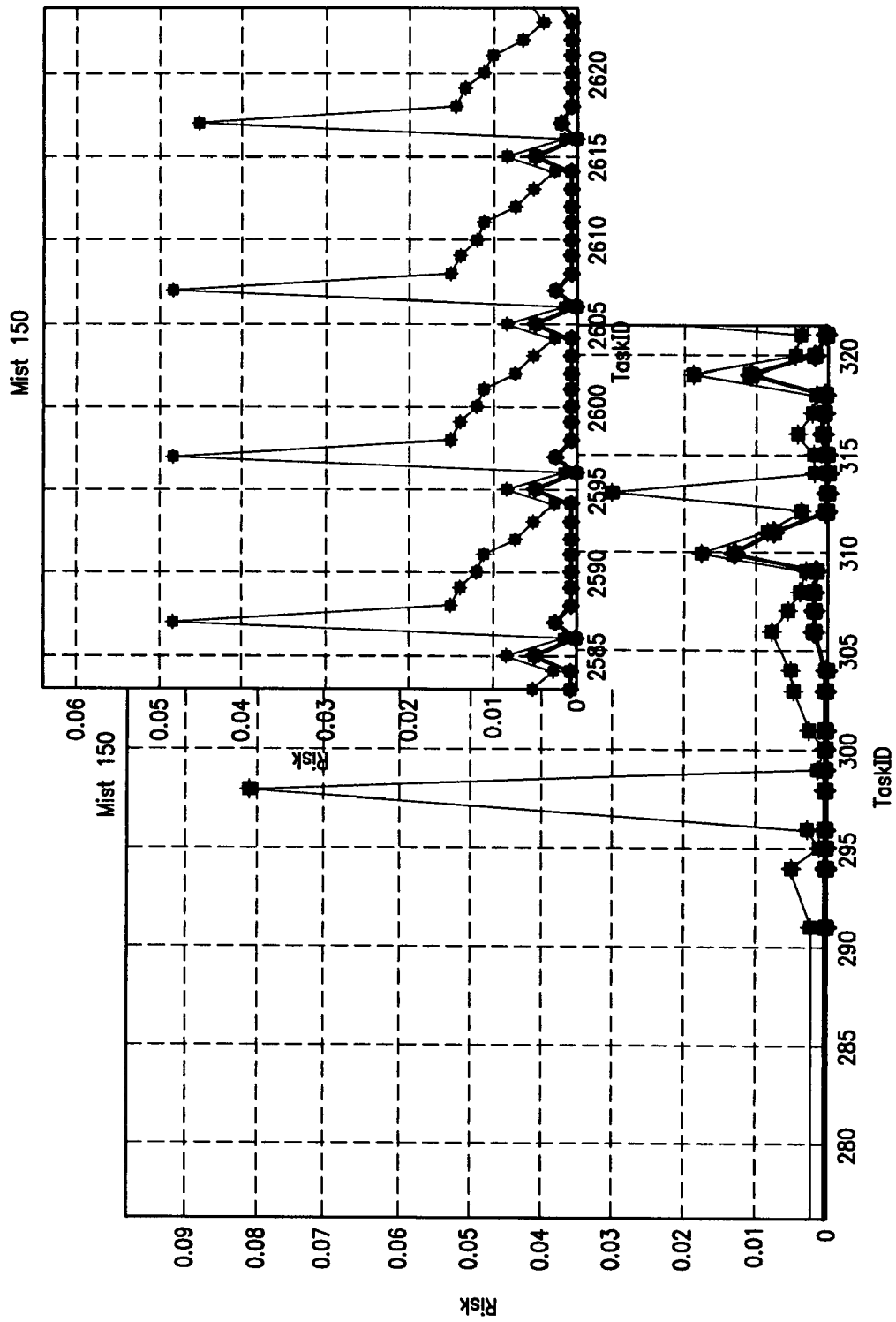
FIG. 10 shows two zoomed fragments of FIG. 9.

When the number of tasks increases, average risk related to one task decreases; however, milestone diagrams similar to FIG. 8 provide comparison of risks caused by each task only from the milestone structure and without knowing the factual task content. An example is shown in FIG. 9 where the task sensitivity diagram is shown of a milestone comprising over 400 tasks. Only several tasks ending just before the milestone have risk ~1; all other tasks have very small risk but there is still very substantial hierarchy (FIG. 10). It is clearly seen that the tasks are organized in hierarchical structure, and some of them have risk at least an order of magnitude higher than the others. With the information presented in FIG. 8-10, relative importance of tasks becomes obvious. Other issues such as optimization of milestone timing, comparison of different plans and providing the task structure having earlier pre-determined risk issues may be also addressed. Thus, the method of this invention improves and optimizes planning and scheduling, and is complementary to existing software tools such as Microsoft Project. At the execution stage, the method uses task delays as inputs to the program and calculates reduction of the milestone probability. Diagrams similar to FIG. 7 are calculated with the perturbations of individual tasks or groups of tasks happening in real time, and new expected milestone dates, together with the reduced probabilities to meet milestones, are reported. Thus, it becomes obvious when the milestone should be re-planned.

System for Performing the Determination of the Milestone Probabilities

Figure 11:
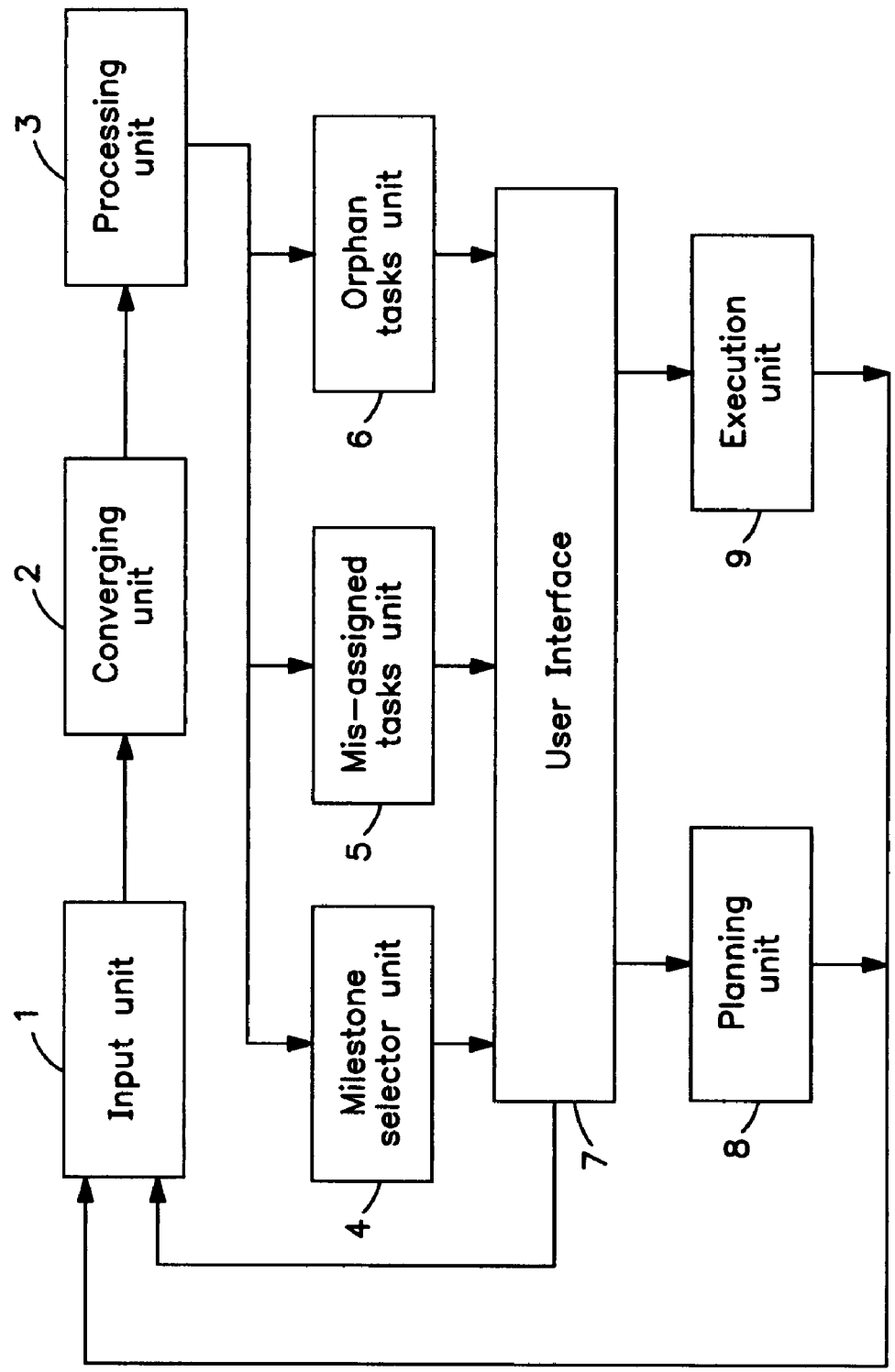
FIG. 11 shows a block diagram of a system designed in accordance with the present invention to perform a method of the present invention.

The method of determining milestone probabilities could be implemented in a wide variety of systems. A system shown in FIG. 11 comprises several software units providing means for inserting and editing input data, analyzing data and getting feedback needed for planning and execution. Unit 1 accepts original project file (Microsoft Project, PrimaVera etc.) Unit 2 converts the file into a universal data sheet format (for example, Microsoft Excel). Unit 3 receives project data in a universal format and extracts data related to each project milestone. Unit 3 also performs different types of data aggregation, for example, sorting data in time, by sub-projects, by geographical locations, by administrative assignment etc. From unit 3, data is transferred to unit 4 choosing the milestone for analysis, and to units 5 and 6 defining task association errors and re-assigning tasks. In one embodiment, unit 5 identifies tasks assigned to milestones by mistake, and unit 6 identifies tasks not reporting to any milestone ("orphan" tasks). Through user interface 7 and the feedback connecting units 7 and 1 shown by the arrow in FIG. 11, the user corrects the file errors. Units 8 and 9 provide milestone analysis on planning (unit 8) and execution (unit 9) stages of the project. Unit 8 defines milestone sensitivity to perturbations of tasks assigned to each milestone, and unit 9 defines non-disturbed milestone temporal profile and compares it to the milestone temporal profile corresponding to actual perturbations of the task or a group of tasks. Outputs of units 8 and 9 shown by the arrow connecting these units to unit 1 in FIG. 11 provide feedback to the system input for project re-design on planning and execution stages.

The system of the present invention may be implemented in many different software environments. For example, units 8 and 9 implementing analytical algorithm may be designed in Matlab. GUI interface 7 and interactive icons 4-6 may be designed as elements of Matlab GUI. Links between Matlab and other environments (Microsoft Project of unit1, Microsoft Excel of unit2) may be implemented in Basic or Visual Basic. Software environment is not restrictive and may be chosen by a software developer.

What is claimed is:

1. A computer-implemented method of managing a project imported by an input unit into a computer system, the project having multiple tasks and milestones, where each task is assigned to at least one milestone, comprising:

processing milestone-related data by a computer system processing unit for obtaining a probability of a respective milestone as a function of a delay of at least one task or combination of the tasks assigned thereto;

assessing a risk of the milestone caused by the task delay;

presenting each task by a waveform propagating from the task to the respective milestone;

presenting each milestone as a coherent superposition of the task waveforms propagating from said each task to its respective milestone;

equating a non-perturbed probability of said each milestone to unity;

perturbing the respective milestone by delaying at least one of its tasks and defining a perturbed probability of the milestone; and comparing the non-perturbed and perturbed probabilities of the respective milestone.

2. The computer-implemented method as set forth in claim 1, wherein said each task has a duration and a time gap between a task end and its milestone and the waveform of said each task has at least a $2\pi$ task phase shift representing at least one activity cycle.

3. The computer-implemented method of claim 2, further comprising:

defining task parameters through quantum mechanical wave function by introducing a task probability amplitude $\psi$ for said each task;

determining a milestone probability amplitude $\Psi$ as a coherent superposition of the task probability amplitudes;

determining milestone probability density P as $P=|\Psi|^2$ and normalizing integral of probability density P to unity;

perturbing said each task sequentially and determining respective variation $\Delta\psi$ of the task probability amplitude $\psi$, and determining probability density for the milestone with perturbed task wave functions.

4. The computer-implemented method of claim 3, wherein defining parameters of the wave function $\psi$ further comprises:

defining a task wave vector k depending on the task duration D and a number of the activity cycles N, and further defining a minimum task wave vector $k_{min}=2\pi/D$, and a task vector as $k_N=2N\pi/D$.

5. The computer-implemented method of claim 4, further comprising:

comparing milestone probability density for perturbed and non-perturbed task wave functions to obtain a risk assessment of the milestone caused by perturbation of wave functions of tasks; and prioritizing the tasks for maximizing the probability of the respective milestones.

* * * * *